March 3, 1970     R. H. DAVIES ET AL     3,498,644

STRAIGHT THREAD BOSS JOINT

Filed Dec. 13, 1967

INVENTORS
ROBERT H. DAVIES
ROBERT W. CORNELL

ATTORNEY
John N. Wolfram

United States Patent Office 3,498,644
Patented Mar. 3, 1970

3,498,644
STRAIGHT THREAD BOSS JOINT
Robert H. Davies, Aurora, and Robert W. Cornell, Gates Mills, Ohio, assignors to Parker-Hannifin Corporation, Cleveland, Ohio, a corporation of Ohio
Filed Dec. 13, 1967, Ser. No. 690,210
Int. Cl. F16l 15/00
U.S. Cl. 285—212                    10 Claims

ABSTRACT OF THE DISCLOSURE

A joint construction in which an elbow fitting having a straight thread is secured and locked to an internally threaded member in any desired angular orientation, the fitting having axially spaced inner and outer externally threaded portions of equal diameter separated by a smooth sealing surface, a resilient gasket deformable into sealing contact with the cylindrical surface and the outer face of the internally threaded member for sealing the joint, rigid means for retaining and deforming the gasket, and a locknut threadedly engaged with the inner threaded portion for advancing the rigid means into deforming contact with the gasket and into tight contact with the boss member to lock the fitting in the desired angular position.

---

This invention relates to joints between fluid conduit fittings, such as T's and elbows, and a boss member, such as a pump or valve body, wherein the parts have interengaged straight threads that are sealed by a resilient gasket that is deformed by means of a locknut threaded onto the fitting, the locknut also serving to lock the fitting in any desired angular position relative to the boss member.

In some prior joints of this type the boss member has a recess at the outer end of the internal thread to receive the gasket. This requires special tooling to machine the recess and the recesses must be machined with considerable accuracy. Also, the recesses require that the internal thread extend deeper into the boss member than if there is no recess, thus increasing the overall size of the boss member.

In other prior joints of this type the external thread on the fitting upon which the locknut is mounted is of larger diameter than the internal thread in the boss member. This results in larger overall dimensions for the fitting and locknut and requires more clearance in an installation and greater center to center distance between adjacent fittings on a boss member and thus also increases the overall size of the latter.

The present invention overcomes these disadvantages by providing a fitting with axially spaced inner and outer externally threaded portions of equal diameter separated by a smooth cylindrical surface of a diameter substantially the same as the minor diameter of the externally threaded portions, a deformable gasket surrounding said cylindrical surface, and a rigid annular retaining means for retaining and deforming the gasket into tight contact with the cylindrical surface and boss member during movement of the retaining means toward the boss member by tightening of a lock nut having threaded engagement with the inner externally threaded portion. The overall dimensions of the locknut and fitting, and the cost of the fitting, are minimized by having the locknut thread the same diameter as the thread in the boss member. Moreover, the parts are so shaped and arranged and the cavity so formed that overstressing of the gasket and extrusion of the same into clearance spaces and threaded portions are avoided whereby the joint may be assembled and disassembled many times without damage to the gasket.

In the embodiments of the invention disclosed herein:

Figure 1:
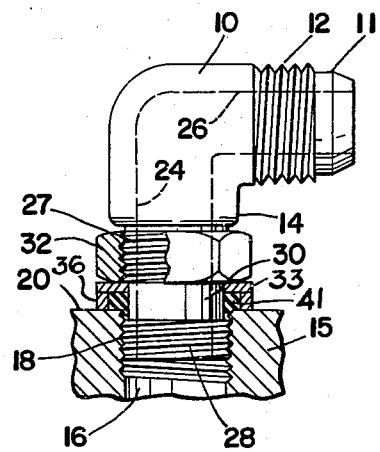
FIGURE 1 is a view, partly in cross section, of one form of the invention showing the completed joint.
Figure 2:
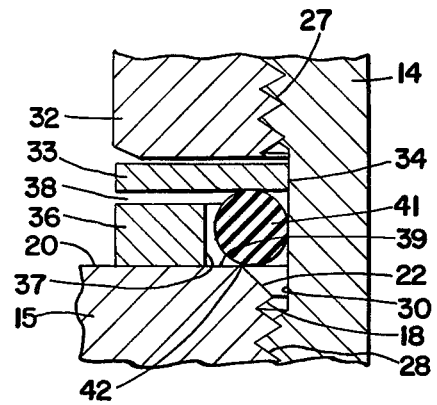
FIGURE 2 is an enlarged fragmentary cross section view showing the parts of FIGURE 1 in their initial loosely assembled position.
Figure 3:
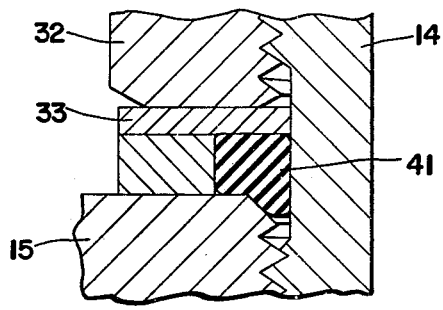
FIGURE 3 is a view similar to FIGURE 2 showing the parts in their final tight assembly position.

In the form of the invention shown in FIGURES 1–3, fitting 10 may be in the form of an elbow with a first leg 11 having a thread 12 for connection to a fluid conveying conduit (not shown). It also has a second leg 14 to be connected to a boss member 15 which may be provided on the body of a pump, valve, or other fluid containing unit having an interior chamber 16. Boss 15 has an internal thread 18 leading from its exterior to chamber 16. On its exterior, boss 15 has a flat contact surface 20 that surrounds thread 18 and which intersects a chamfer 22 formed on the outermost internal thread and which is of 90° included angle and of a diameter the same as or a few thousandths of an inch larger than the major diameter of thread 18.

Fitting leg 14 has a fluid passage 24 therein that communicates with fluid passage 26 in leg 11. Leg 14 also has axially inner and outer externally threaded portions 27, 28 of equal diameter and pitch that are separated by a smooth cylindrical surface 30 of a diameter equal to or slightly less than the minor diameter of threads 27, 28.

Thread 28 is engageable with internal thread 18 and thread 27 has a locknut 32 threaded thereon. A flat metal washer 33 is assembled to fitting 10 and it has a smooth unthreaded inner cylindrical surface 34 that is a snug fit upon smooth cylindrical surface 30. Assembly of washer 33 to fitting 10 may be accomplished by first cupping the washer to frusto-conical form whereby its inside diameter 34 is large enough to pass over external thread 28 and then flattening the washer to reduce its inside diameter to closely approximate the diameter of cylindrical surface 30.

Located between washer 33 and boss 15 is a rigid metal ring 36 having an inside diameter 37 that is larger than chamfer 22 to expose a portion 39 of boss contact surface 20.

Located within ring 36 is a resilient gasket 41 of deformable rubber-like material. This gasket is preferably in the form of an O ring, that is, with an initially circular cross section, but it may be of other cross section configuration. Gasket 41 is preferably initially of a size to make light contact with cylindrical surface 30 and to have a slight clearance with ring inside diameter 37 and to project axially beyond ring 36 when the lower end of the gasket is in initial contact with boss member 15. Also, initial contact of gasket 41 is preferably with circular edge 42 formed by the intersection of boss contact surface 20 and chamfer 22.

To make up the joint, locknut 32 is threaded onto inner external thread 27 so as to clear substantially all of smooth cylindrical portion 30. Washer 33 is then assembled to portion 30 in the manner already described and moved into, or nearly into, contact with the locknut. This much of the assembly operation is usually performed at the factory. The installer then slips gasket 41 over cylindrical portion 30 and ring 36 is either slipped over gasket 41 or placed upon boss 15 so as to surround thread 18.

Fitting 10 is then assembled to boss 15 by threading external thread 28 into internal thread 18 until gasket 41 makes light contact with edge 42. At this time washer 33 will be spaced from flat face 20 a distance, which together with any space that may exist between washer 33 and locknut 32, is greater than the thickness of ring 36 by an amount that is preferably greater than the pitch of thread 18, although in some forms of the invention it may be less than such pitch.

Fitting 10 is then threaded further into boss 15 until leg 11 is pointed in the desired angular direction relative to boss 15. Because this pointed operation will require no more than 360° of rotation of leg 11 about the axis of leg 14, there may be either a remaining space 38 between washer 33 and ring 36, or a corresponding remaining space between ring 36 and flat face 20.

At this time locknut 32 is threaded toward boss 15 to bring washer 33 into tight contact with ring 36 and the latter into tight contact with face 20. This causes gasket 41 to deform as shown in FIGURE 3. Gasket 41 is of a volume so that in its final deformed position it substantially fills the cavity formed by washer 33, ring 36, boss face portion 39, chamfer 22, and cylindrical surface 30, but it does not overfill such cavity and thus deformation of the gasket into the threaded area inward of chamfer 22 and consequent cutting of the gasket by such threads is avoided.

The initial contact at edge 42 provides a definite feel to the installer when threading the fitting into the boss so that such threading will be discontinued except for rotation of the elbow to its desired angular position. Also, because of the rounded configuration provided by the O ring, extrusion of gasket material between ring 36 and either washer 33 or boss contact surface 20 is avoided and full metal-to-metal contact between these parts is obtained for effectively locking fitting 10 in its selected angular position. Because the resilient gasket is fully protected against extrusion adjacent ring 36 and between washer 33 and surface 30 and is not forced into threads 18, cutting and wearing away of the gasket is avoided and the joint is capable of being assembled and disassembled many times and it will still withstand fluid pressures in excess of 3,000 p.s.i. without leakage.

Figure 4:
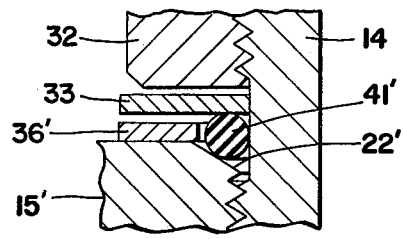
FIGURE 4 is an enlarged fragmentary cross section view of a modified construction in loosely assembled position.

The form shown in FIGURE 4 is similar to FIGURES 1–3 except that chamfer 22' is of larger included angle and of larger diameter, O ring 41' is of smaller cross section diameter and ring 36' is thinner and of smaller I.D. than in the corresponding parts of FIGURE 1–3. When locknut 32 is threaded toward boss member 15' it forces washer 33 against ring 36' and the latter tightly against boss member 15. This also causes O ring 41' to deform so as to substantially fill its cavity.

Figure 5:
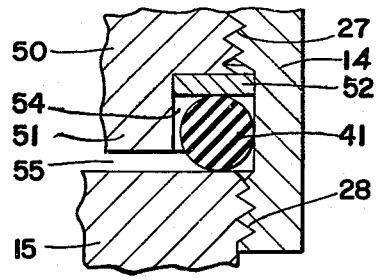
FIGURE 5 is an enlarged fragmentary section view of another modification.

In the form shown in FIGURE 5, fitting 10, O ring 41 and boss member 15 are identical to those in FIGURES 1–3 and locknut 50 has an extension 51 that takes the place of ring 36 in FIGURES 1–3 to form a cavity within the locknut to receive metal washer 52 and O ring 41. Washer 52 has a snug fit with smooth cylindrical portion 30 of the fitting and also with the inner diameter 54 of extension 51. Extension 51 may be an axial length such that when the parts are loosely assembled and O ring 41 is making light contact with boss member 15 and washer 52, the space 55 between extension 51 and boss member 15 is less than the pitch of thread 27 but preferably it is greater than the pitch but not more than twice the pitch.

When the locknut 50 is advanced toward boss member 15 from the loosely assembled position shown in FIGURE 5, the lower end of extension 51 will contact flat face 20 to lock the elbow in its desired angular position and to deform gasket 41 in the same manner illustrated in FIGURE 3 in which it substantially completely fills the cavity in which it is contained without extruding between washer 52 and either cylindrical surface 30 or locknut surface 54 and without being forced into the area of engagement between threads 18 and 28.

Figure 6:
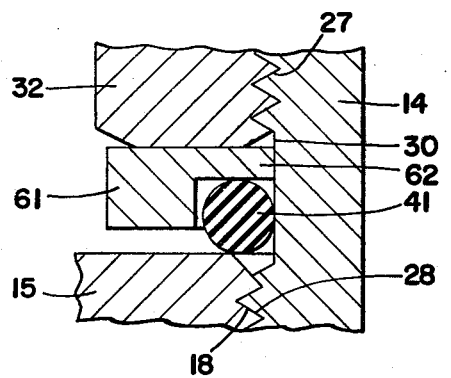
FIGURE 6 is an enlarged fragmentary section view of still another modified form.
Figure 7:
FIGURE 7 is a section view of the gasket retainer of the FIGURE 6 form.

The FIGURE 6 form is the same as FIGURES 1–3 but with washer 33 and ring 36 of the latter combined into an integral retainer 61. Flange 62 of this retainer may initially be formed conically as shown in FIGURE 7 so that the retainer may be passed over external thread 28 after which it is flattened to the position shown in FIGURE 6 with its inside diameter a snug fit with smooth cylindrical portion 30.

We claim:

1. In a joint, a boss member having an internal thread surrounded by a contact surface, a second member having axially inner and outer externally threaded portions of equal diameter separated by a smooth cylindrical surface of a diameter substantially the same as the minor diameter of said externally threaded portions, said outer externally threaded portion being threadedly engaged with the internal thread and said inner externally threaded portion having a locknut threadedly engaged therewith, a resilient gasket on said smooth cylindrical surface, a rigid annular retaining means for said gasket including a first portion radially outward of said gasket and a second portion having an inside diameter closely fitted to said cylindrical surface, said gasket being axially between said second portion and said boss member and when undeformed being of greater axial length than said first portion, said locknut being threadable toward said boss member to bring said means into tight contact with said contact surface and with said gasket to deform said gasket into tight sealing engagement with said boss member and said cylindrical surface.

2. The joint of claim 1 in which said gasket when undeformed has a circular cross-section and said internal thread has a chamfer at its outer end, said chamfer constituting a wall portion of said contact surface that is engaged by the deformed gasket, the axial outer edge of said chamfer being radially inward of said first portion to permit initial contact by said gasket during threading of said outer externally threaded portion of said second member into said boss member to provide resistance to further threading of said outer externally threaded portion into said boss member.

3. The joint of claim 2 in which said means, boss member, and smooth cylindrical surface define a cavity which when said locknut is tightened is substantially completely filled by the deformed gasket, said boss member having a smooth flat face that intersects said chamfer and is engaged by said means.

4. The joint of claim 1 in which the axial length of the undeformed gasket is greater than the axial length of said first portion by a distance at least equal to the pitch of said internal thread.

5. The joint of claim 4 in which the axial length of the undeformed gasket is greater than the axial length of said first portion by a distance no greater than twice the pitch of said internal thread.

6. The joint of claim 1 in which said contact surface is flat and planar and is intersected by a chamfer that extends radially outwardly substantially to the inside diameter of said first portion.

7. The joint of claim 1 in which said first and second portions are separate members, said first portion being adjacent said boss member and said second portion extending between and engageable by said first portion and said locknut.

8. The joint of claim 1 in which said first and second portions are integral but separate of said locknut.

9. The joint of claim 1 in which said first portion is integral with said locknut and separate of said second portion, said first portion surrounding said second portion, and the inside diameter of said first portion having a snug fit with the outer diameter of said second portion.

10. The joint of claim 1 in which said gasket when undeformed has a circular cross-section and makes light contact with said cylindrical surface, and there is an initial slight radial clearance between said first portion and said gasket which is taken up upon deformation of said gasket as aforesaid.

References Cited

UNITED STATES PATENTS

| | | | |
|---|---|---|---|
| 2,373,253 | 4/1945 | Martin | 285—220 |
| 2,919,147 | 12/1959 | Nenzell | 285—220 X |
| 2,960,353 | 11/1960 | Woodling | 285—212 X |
| 3,004,574 | 10/1961 | Flick et al. | 285—220 X |
| 3,004,776 | 10/1961 | Sebardt | 285—220 X |
| 3,106,413 | 10/1963 | Hamlin et al. | 285—212 |
| 3,148,901 | 9/1964 | Campbell | 285—212 |
| 3,259,404 | 7/1966 | Papenguth | 285—212 |

FOREIGN PATENTS 1,094,055  12/1960  Germany.

REINALDO P. MACHADO, Primary Examiner
WAYNE L. SHEDD, Assistant Examiner

U.S. Cl. X.R.

285—220